United States Patent [19]
Yee et al.

[11] Patent Number: 5,847,679
[45] Date of Patent: *Dec. 8, 1998

[54] GPS BASED SEARCH AND RESCUE SYSTEM

[75] Inventors: David Moon Yee; Robert Henry Bickley; Charles Herbert Brenner, all of Scottsdale; Philip John Zucarelli, Glendale; Theodore Wolley Keller; Christopher Kent Moyer, both of Scottsdale, all of Ariz.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 877,592
[22] Filed: Jun. 17, 1997

Related U.S. Application Data

[63] Continuation of Ser. No. 299,029, Aug. 31, 1994, Pat. No. 5,748,147, which is a continuation of Ser. No. 103,177, Aug. 6, 1993, abandoned, which is a continuation of Ser. No. 845,903, Mar. 4, 1992, abandoned.

[51] Int. Cl.⁶ .............................. H04B 7/185; G01S 5/02
[52] U.S. Cl. ........................... 342/357; 701/213; 701/214
[58] Field of Search ............................ 342/357; 701/213, 701/214

[56] References Cited

U.S. PATENT DOCUMENTS

| 5,414,432 | 5/1995 | Penny, Jr. et al. | 342/357 |
| 5,506,587 | 4/1996 | Lans | 342/357 |
| 5,519,403 | 5/1996 | Bickley et al. | 342/352 |

*Primary Examiner*—Theodore M. Blum
*Attorney, Agent, or Firm*—Bradley J. Botsch; John C. Scott

[57] ABSTRACT

A GPS based search and rescue system utilizes an airborne interrogation unit for extending the range of a second interrogation unit. The airborne unit relays communication between a survival radio and the second interrogation unit. The second interrogation unit is typically a ground based unit and is arranged to provide GPS correction information to the survival radio. The normal line of sight communication between a survival radio and an interrogation unit is extended to an over the horizon communication path by utilizing the airborne interrogation unit as a relay for communications.

20 Claims, 5 Drawing Sheets

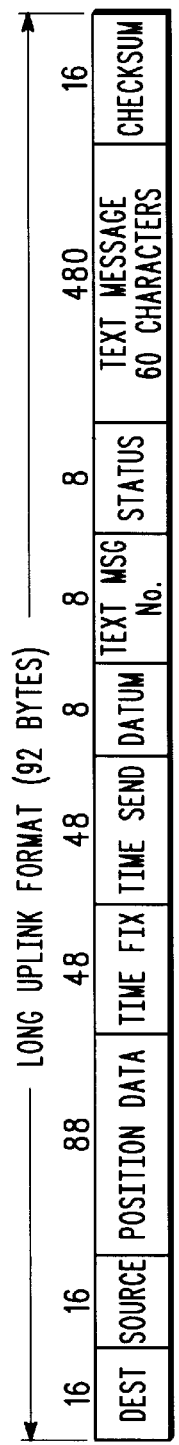
FIG. 7
FIG. 8
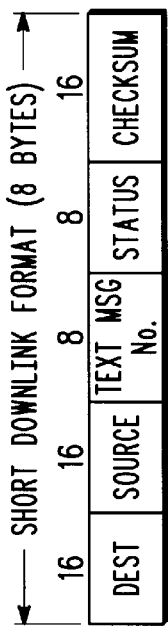
FIG. 9
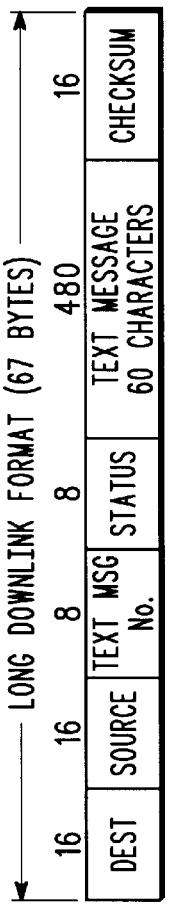
FIG. 10

GPS BASED SEARCH AND RESCUE SYSTEM

The present application is a continuation in part of prior U.S. application No. 08/299,029, filed Aug. 31, 1994 now U.S. Pat. No. 5,748,147; which is a continuation in part of U.S. application No. 08/103,177, filed Aug. 6, 1993 now abandoned; which is a continuation of U.S. application No. 07/845,903, filed Mar. 4, 1992 now abandoned; which is a continuation of U.S. application No. 07/845,903, filed Mar. 4, 1992 now abandoned; the disclosures of all of which are hereby incorporated by reference, and priority thereto for common subject matter is hereby claimed.

FIELD OF THE INVENTION

This invention pertains to radios, in general, and to search and rescue radio systems, in particular.

BACKGROUND OF THE INVENTION

When a search and rescue operation is required, as for a downed airplane or helicopter pilot for example, search and rescue radio (SAR) system interrogators are typically employed. Such search and rescue radio systems include a small portable radio which is in the possession of the downed pilot. Such systems may further include an interrogation unit which is typically carried in the rescue aircraft (helicopter or plane).

Important information required by the search and rescue aircraft includes correct identity of the survival radio. Identification is important to avoid, for example, decoy signals or traps by hostile forces. Other important information is the location of the radio and associated downed pilot.

The Global Positioning System (GPS) is particularly useful for determining position. Survival radios have been known to have GPS receivers capable of self determination of position.

Search and rescue interrogation units typically include a GPS receiver, portable computer and a separate transceiver. Communication between interrogation units and survival radios is linked to Line of Sight (LOS) communication links. However, in many cases, it would be desirable to extend the LOS communication link to communication links that could extend over the horizon (OTH).

BRIEF DESCRIPTION OF THE DRAWING

The invention will be better understood from a reading of the following detailed description taken in conjunction with the drawing in which like reference designators are used to designate like elements and in which:

FIG. 7 through 10 illustrate message formats.

DETAILED DESCRIPTION OF THE PREFERRED EMBODIMENT

Figure 1:
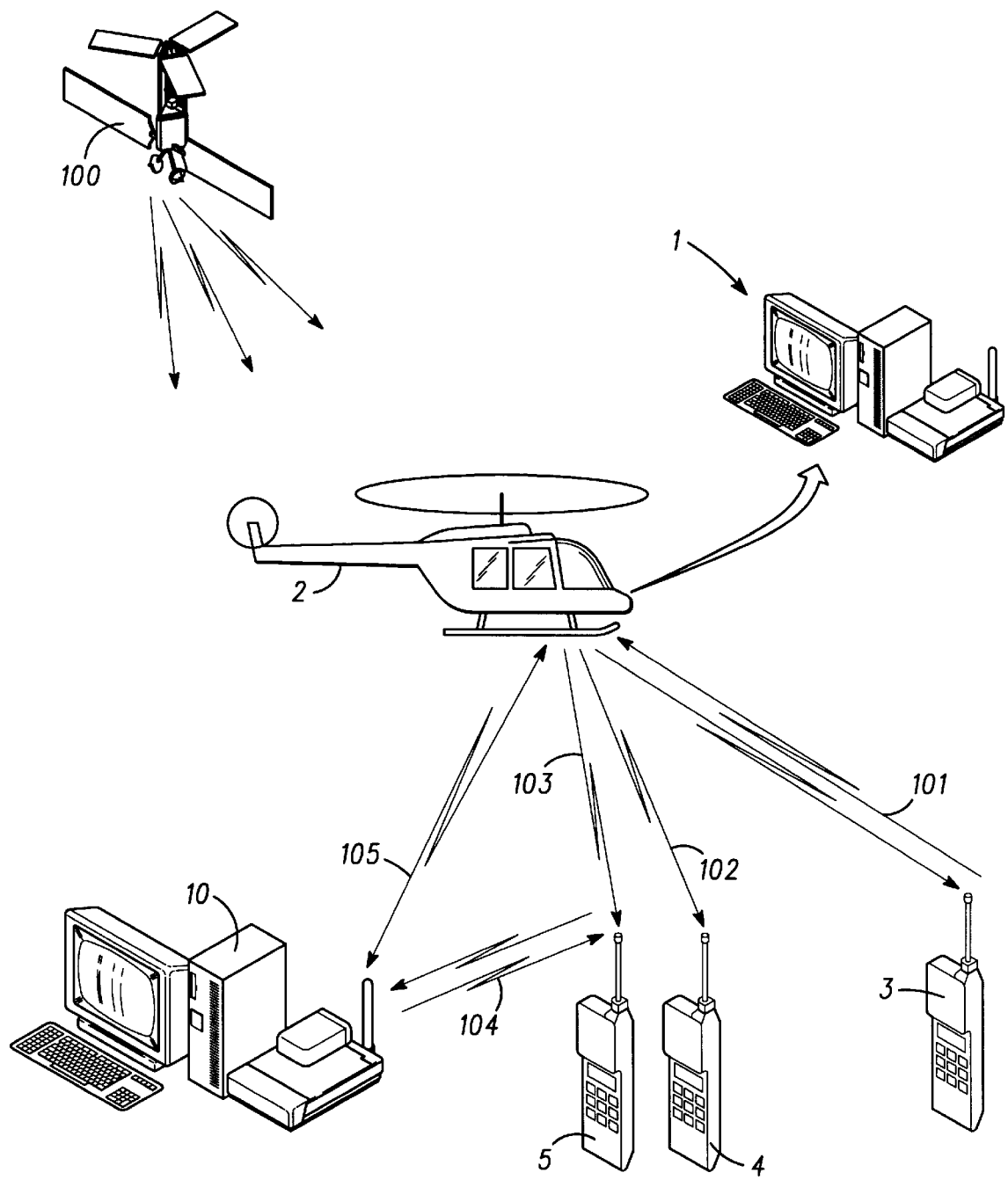
FIG. 1 is a block diagram of a SAR system in accordance with the principles of the invention.

A search and rescue system in accordance with the principles of the invention is depicted on FIG. 1. An airborne interrogation unit 1 is operated aboard the helicopter 2 by one of the occupants of the helicopter 2. The interrogation unit 1 transmits signals to interrogate any survival radio with GPS capability such as the PRC-112 type survival radios 3, 4 and 5. The helicopter 2 based interrogation unit 1 is a substantially Line of Sight (LOS) radio system and communicates to the SAR survival radios in the LOS paths 101, 102, 103.

Each survival radio 3, 4 and 5 has a unique identification number which the interrogation unit 1 is programmed to interrogate. Each survival radio 3, 4, 5 can act as a transponder supplying ranging and identification information in response to interrogation signals. Each can also perform as an emergency beacon by transmitting an emergency swept tone beacon signal. Each can also provide substantially Line of Sight (LOS) voice communication.

Survival radios 3, 4 and 5 are typically in the possession of a downed pilot or other aircraft personnel. When searching for a downed pilot, the interrogation unit 1 is triggered and a GPS compatible message is generated. The interrogation unit 1 is connected to the helicopter avionics transceiver. The interrogation unit may include an integral transceiver unit of conventional design rather than using the helicopter transceiver. The helicopter transceiver radio transmits interrogation messages to the survival radio 3 and receives response message from the survival radio 3. When the interrogation unit 1 receives a response signal from survival radio 3, the response will be a message including a survival radio identification number, GPS position information of the position of the survival radio 3 and status information is obtained. From this information the interrogation unit 1 can quickly determine the range and bearing of the survival radio 3 from the helicopter 2 once the aircraft's position is known.

The interrogation unit 1 plugs into the helicopter 2 intercom/radio system which is not shown but may be any conventional radio system. Interrogation unit 1 includes a processor which may be in a personal computer coupled to a radio via a modem. The interrogation unit 1 is capable of transmitting and receiving GPS radio messages including location and messaging information of the survival radio 3, 4, 5 being sought by the search.

As described above, the interrogation unit 1 communicates with the survival radios 3, 4 and 5 which have embedded GPS capability. GPS capability means the ability to self determine position through the use of the GPS constellation of satellites. The Global Positioning System (GPS) may be used to determine the position of a GPS receiver on or near the surface of the earth from signals received from a constellation of satellites. The orbits of the GPS satellites are arranged in multiple planes in order that signals can be received from at least four satellites at any position on earth. More typically, signals are received from six or eight satellites at most places on the earth's surface.

Orbits of GPS satellites are determined with accuracy from fixed ground stations and are relayed to the spacecraft. The latitude, longitude and altitude or any point close to the surface of the earth can be calculated from the times of propagation of the electromagnetic signals from four or more of the satellites. A measured range, referred to as a "pseudorange", is determined between the GPS receiver and the satellites based upon these propagation times. The measured range is referred to as pseudorange because there is typically a time offset between timing clocks on the satellites and a clock within the GPS receiver. To determine a three dimensional position, at least four satellite signals are needed to solve for the four unknowns represented by the time offset and the three dimensional position.

The nature of the signals transmitted from the GPS satellites is well known from the literature. Each GPS satellite transmits two spread spectrum, L-band carrier signals, referred to as L1 and L2 signals. Two signals are needed if it is desired to eliminate any error that arises due to refraction of the transmitted signals by the ionosphere. The L1 signal from each GPS satellite is Binary Phase Shift Keyed (BPSK) modulated by two pseudorandom codes in phase quadrature. A pseudorandom code sequence is a series of numbers that are random in the sense that knowledge of which numbers have been already received does not provide assistance in predicting the next received number. Using a binary pseudorandom code to modulate the phase of a carrier signal produces a suppressed carrier spread spectrum signal. The L2 signal from each satellite is BPSK modulated by only one of the pseudorandom codes. Use of the pseudorandom codes allows use of a plurality of GPS satellite signals for determining a receiver's position and for providing navigation information. A signal transmitted by a particular GPS satellite is selected by generating and matching, or correlating, the pseudorandom code for that particular satellite.

Some of the pseudorandom codes are known and are generated or stored in GPS receivers. Other pseudorandom codes are not publicly known.

A first known pseudorandom code for each GPS satellite is referred to as a "clear acquisition" or C/A code. The C/A code is intended to facilitate rapid satellite signal acquisition and is a relatively short, coarse grained code. The C/A code for any GPS satellite has a relatively short length before it repeats. A second known pseudorandom code for each GPS satellite is referred to as a "precision" or P-code. The P-code is a relatively long, fine grained code. The full P-code has a length of 259 days, with each satellite transmitting a unique portion of the full P-code. The portion of P-code used for a given GPS satellite has a length of precisely one week before the portion repeats.

In GPS receivers, signals corresponding to the known P-code and C/A-code may be generated in the same manner as in the satellites. The L1 and L2 signals from a given satellite are demodulated by aligning the phases, i.e., adjusting the timing of the locally generated codes with those received from the satellites. To achieve phase alignment, the locally generated code replicas are correlated with the received satellite signals until the resultant output signal reaches a peak. Because the time at which each particular bit of the pseudorandom sequence is transmitted from the satellite is defined, the time of receipt of a particular bit can be used as a measure of the range to the satellite. Because the C/A and P-codes are unique to each GPS satellite, a specific satellite may be identified based on the results of the correlations between the received GPS signals and the locally generated C/A and P-code replicas. Methods for generating the C/A code and P-code are set forth in various publicly available publications.

The C/A code component of the L1 signal is provided for commercial use. Various techniques have been developed to replicate the C/A code in GPS receivers. As a consequence of the repetition of the C/A-code approximately once every millisecond, correlation at the GPS receiver may be performed in the absence of precise knowledge of the time of transmission of each C/A code bit. Acquisition of the P-code is generally acquired by first locking on to the C/A-code. Once the C/A-code has been acquired, the C/A-code modulated carrier component of the L1 signal carrier alone may allow for satisfactory measurements. However, when high resolution measurements are desired to be made quickly, the L2 carrier signal must also be used. The unknown atmospheric delay of the L1 and L2 carriers may be eliminated when both of the L1 and 12 carriers are used.

The GPS signals are intended to be recovered by correlating each incoming signal with a locally generated replica of each code, both the P-code and the C/A-code. The result of such correlation is that the carrier in the GPS signals is totally suppressed when the modulating signal is the pseudorange code sequence like the P-code or the C/A-code. The locally generated code is adjusted in timing to provide an optimum correlation with the incoming signal. The correlation output is then a single narrowband peak centered at the carrier frequency. The carrier recovered by correlation provides the best available signal-to-noise ratio.

For various reasons, it is not desirable to utilize the P-code capability in survival radios or in the airborne interrogation units. These apparatus utilize the line account C/A code.

Absolute GPS position accuracy is improved in a system in accordance with the invention utilizing the C/A code by the use of GPS differential correction or pseudo range data sent to the survival radios 3, 4 and 5 from a ground based interrogation unit 10. The correction data is based upon an accurate surveyed location of the ground based interrogation unit 10. For SAR applications, the accuracy of the relative position between an interrogation unit disposed in a SAR rescue vehicle and the survival radio unit 3, 4 or 5 is equivalent to that afforded by differential correction data without the need of a surveyed fixed ground based interrogator.

The range of the system is extended to an over the horizon (OTH) system between the survival radio units 3, 4 and 5 and the ground based interrogation unit 10 by utilizing the interrogation unit 1 aboard the helicopter 2 to relay data between the survival radio units 3, 4 and 5 and the ground based interrogation unit 10. A polling protocol is utilized having a unique identification code for each communication element. Burst data transmission protocol with bit interleaving, forward error correction and encryption in order to maximize the communication range of the SAR system and to minimize unauthorized reception and utilization of the transmitted information.

In the system of the illustrative embodiment, an identified number field is included in each message transmitted from a survival radio. That field can provide for up to 65,535 survival radio units such as units 3, 4 and 5 on one frequency. This results from the use of 65,536 unique identification numbers being allowable in the identification number field. One of the identification numbers is reserved for the interrogation unit 1. Information is passed to and from the survival radios 3, 4 and 5 to the ground based unit 10 through either a direct LOS UHF radio link 104, or through an OTH UHF radio link comprising LOS link 105 and LOS link 101 by relaying through interrogation unit 1 aboard the airborne platform 2. The SAR interrogation unit 1 can operate autonomous of the ground based interrogation unit 10 and can directly initiate LOS interrogations of the survival radio units 3, 4 and 5. This later mode of operation is useful during the terminal portion of a SAR operation. Transmission and reception of position and messaging data between the survival radio units 3, 4 and 5 and the interrogation unit 1 is facilitated by the use of a digital modem utilizing any one of a number of modulation formats such as multilevel FSK, PSK, BPSK, MSK or GSK.

Figure 2:
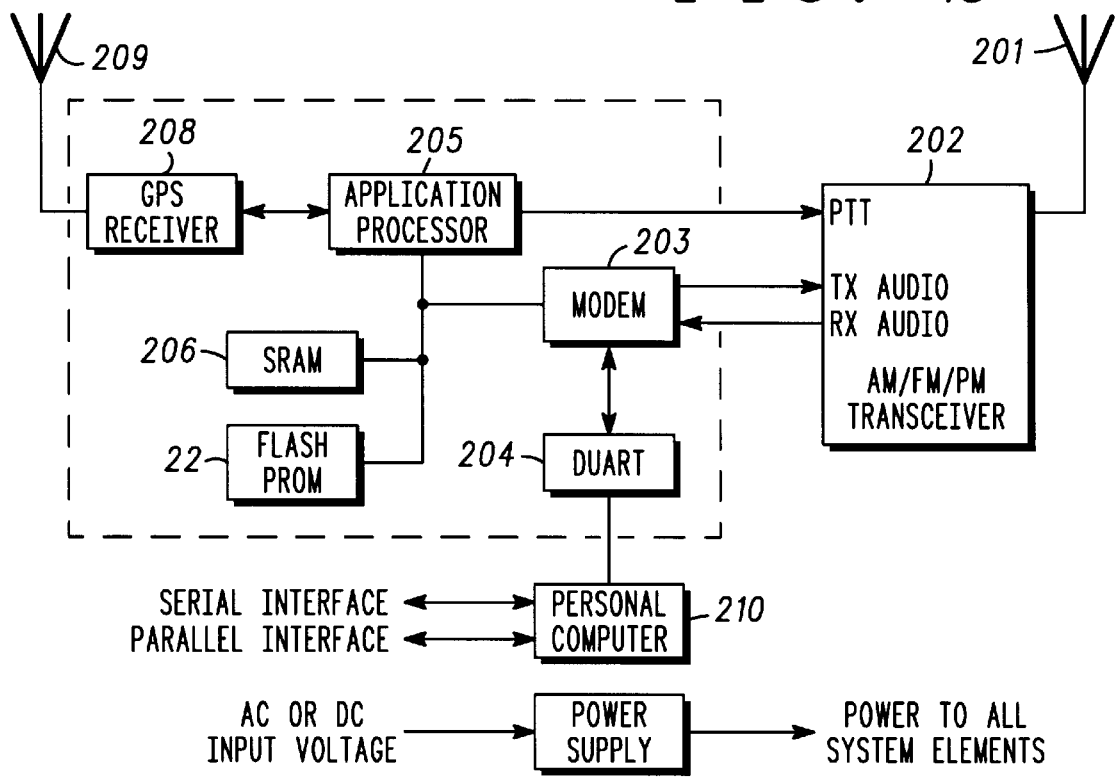
FIG. 2 is a block diagram of an interrogation unit in accordance with the principles of the invention.

Turning now to FIG. 2, a block diagram of the interrogation unit 1 is shown. The interrogation unit 1 includes a transceiver 202 which may be the aircraft transceiver or may be a transceiver dedicated for use with the interrogation unit 1. The transceiver 202 utilizes an antenna 201 to transmit and receive over a LOS communication link. The transceiver 202 as well as antenna 201 may be of conventional design. Any known modulation types and data rates may be used.

To maximize communication range and minimize the probability of reception by undesirable or unauthorized entities, data for transmission and data received by the transceiver 202 is processed by Digital Encryption. Standard (DES) encryption, BCH forward error correction encoding, bit interleaving, UART formatting and parity checksum bits. Software to accomplish these tasks is partitioned between an application processor 205 and a personal computer 210. The application processor 205 executes a program instruction set and interfaces to the external interfaces such as the transceiver 202 PTT (push to talk) control, Modem −1c. 203, RS-232 DUART 204 (Digital Universal Asynchronous Receiver Transmitter) and to a GPS receiver 208. The processor 205 may be implemented with a MC68331 Motorola microprocessor or with other commercially available processors.

SRAM 206 stores temporary data during operation of the interrogation unit 1. Data stored includes such data as identification codes of the PRC-112 survival radio 3, 4 and 5 and set up configurations for the interrogation unit 1.

Flash PROM 22 stores the executable programs of the interrogation unit 1. PROM 22 can be reloaded with new operation instructions if necessary by using the DUART 204. DUART 204 supports an RS-232 interface port. DUART 204 is connected to the application processor 205 and converts parallel data from applications processor 205 to serial data to meet the RS-232 standard. The RS-232 interface is used so that the personal computer 210 can operate as the human interface to the system and to permit programming and upgrading the executable software in the application processor 205 and the parameters stored in the flash prom 22.

Modem 203 creates MSK tones from the digital data stream in the TX Audio input to the transceiver 202 from the personal computer 210 and also converts received MSK tones on RX Audio output from the transceiver 202 to digital data to be sent to the personal computer 210. The MSK modem 203 is buffered and level controlled via audio circuitry which provides the interface to the transceiver 202.

Personal computer 210 provides the user interface to the SAR rescue operator. The personal computer 210 includes a display (not shown) which may be used to display parameters such as identification number, encryption key status, an outgoing message and data received from a PRC-112 survival radio such as identification number, position, time and any message. The personal computer 210 is also used via its keyboard (not shown) to input data for display. The keyboard may provide menu selections of various functions.

The interrogation unit 1 also contains a GPS receiver 208 to provide a source of differential correction data. The GPS receiver 208 also allows the relative range between the interrogation 1 and the survival radio unit 3, 4 or 5 to be calculated. The personal computer 210 is used by the operator to select a message to be sent, to initiate an interrogation. Personal computer 210 includes a display device to present information to the operator of the SAR interrogator unit such as the location of the survival radio unit 3, 4 or 5, messages sent and distance to the survival radio unit 3, 4 or 5 and to setup system parameters such as unit identification numbers, encryption keys, whether the system is operating in a relay mode and other parameters. The GPS receiver 208 of the interrogation unit 1 may be of conventional design.

Figure 3:
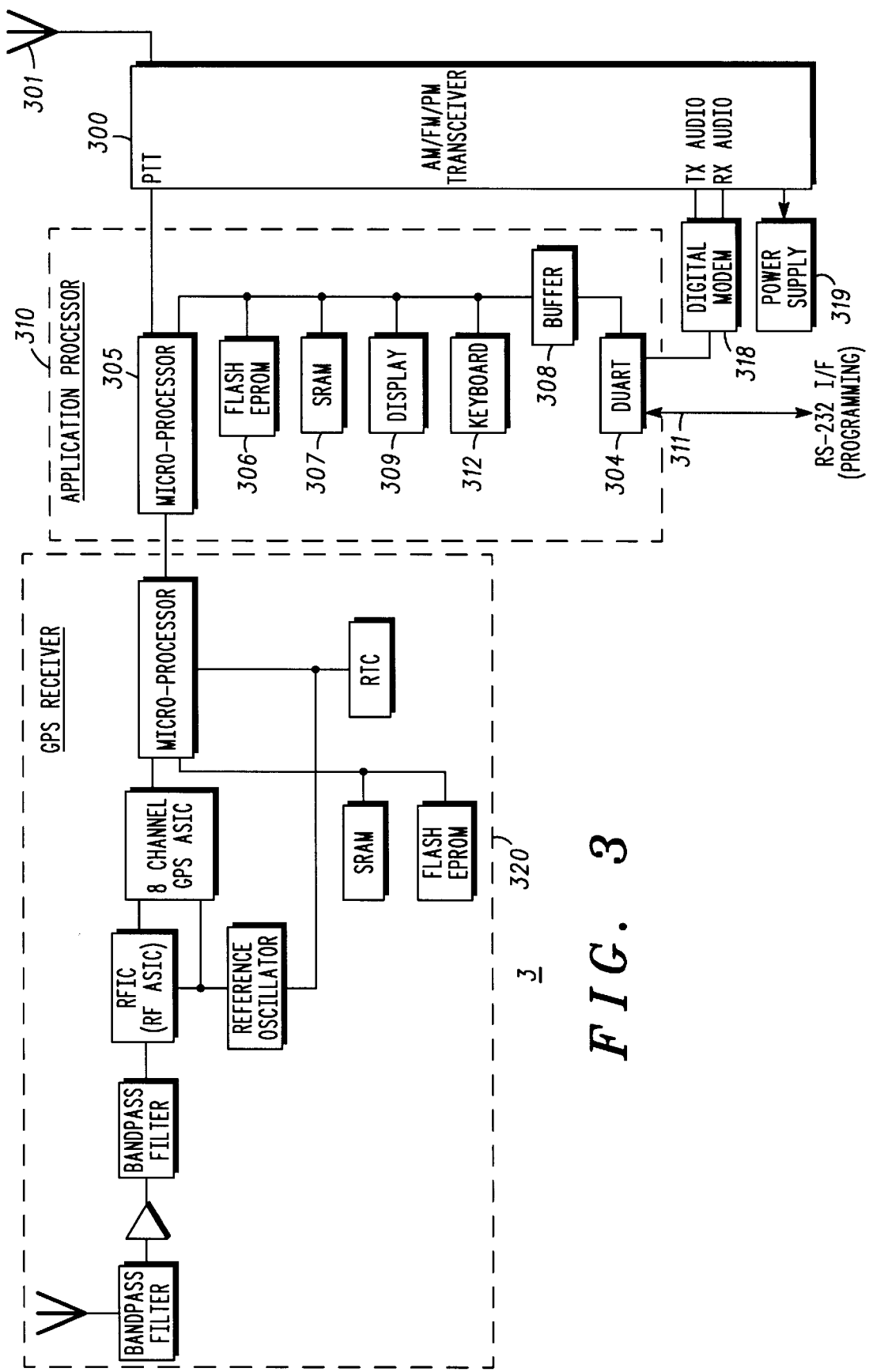
FIG. 3 is a block diagram of a SAR radio unit in accordance with the principles of the invention.

Turning now to FIG. 3, a survival radio unit 3 is shown in block diagram. The survival radio unit 3 as noted above can function in several modes. In one operational mode, the radio unit 3 will function as a transponder, detecting a transmitted ID code (DME ID) from the interrogation unit 1. If the transmitted ID code is identical to the code programmed into the radio memory (Survivor ID Code), survival radio 3 responds by keying a transmitter and transmitting ranging modulation. The survival radio 3 may also operate in an emergency beacon mode. In this mode, the survival radio 3 transmits an emergency swept tone beacon signed compatible with conventional UHF/VHF Automatic Direction Finding (ADF) equipment. In a third mode, the survival radio unit 3 may function as a conventional two-way radio by providing for voice transmission over LOS paths.

The survival radio unit 3 includes a transceiver 300 coupled to an antenna 301. The transceiver 300 and antenna 301 may be of conventional design. The transceiver 300 includes a PTT control input as well as a transmit audio input, TX Audio, and a receive audio output, RX Output. An application processor 310 is coupled to the transceiver 300. The application processor 310 includes a microprocessor 305 which may, for example, be a Motorola MC68331 microprocessor in conjunction with a flash EEPROM 306 and a SRAM 307 both of which are commercially available products. The application processor 310 executes a program instruction set and interfaces to a keypad 310, display 309, the PTT control, TX Audio and RX Audio connections to the transceiver 300, the GPS receiver 320 and to a programming port 311.

Display 309 may be a LCD (Liquid Crystal Display) device and displays various information such as GPS information, outgoing message information and data received.

Keypad 310 is a part of the user/radio interface and is a multi-button keypad which provides input data as mentioned above for control of the radio 3.

SRAM 20 stores temporary data during operation of the radio 3. Data stored includes such data as GPS data, data received from an interrogator 1 and various menu selections.

Flash EPROM 306 stores executable programs of the radio 3 as well as the identification code of the radio 3. EPROM 306 can be reloaded with new programming data by using the DUART 304 and the programming port 311.

Buffer 308 is provided as a buffer between the DUART 304 and the microprocessor 305. Buffer 308 is of conventional design and may be incorporated into the DUART 304.

DUART 304 provides for a RS-232 interface at port 311. The DUART is connected to the microprocessor 305 via the buffer 308 and converts parallel data for microprocessor 305 into serial data for the RS-232 standard. The RS-232 interface is used primarily for programming and upgrading the executable software in the radio 3.

Digital modem 318 creates the MSK tones from the digital data stream from the microprocessor 305 to the TX Audio input of the transceiver 300 and also converts the received MSK tones at the RX Audio output of the transceiver 300 to the digital signals for use by the microprocessor 305.

Power supply 319 supplies the particular voltages required for operation of each of the various units included in the radio 3. The power supply 319 includes a battery which is not shown.

The radio 3 further includes a GPS receiver 320. The GPS receiver is of a conventional design and provides the location information of the radio 3 and GPS based time. With location information from the GPS receiver 320, the microprocessor 305 can provide position and time information on the display 309 as well as responding to an interrogation request to transmit the positional information to the interrogation unit 1.

In operation, and with reference to FIGS. 1, 2 and 3 when searching for a downed pilot, the interrogation unit 1 formats a survival radio message through personal computer 210 and sends the message through modem 203 to the transceiver 202 via the TX Audio input to the transceiver 202. Interrogation is typically made for a specific survival radio, for example, survival radio 3 by selection of an appropriate identification number.

When the interrogation unit 1 receives a response from survival radio 3, a message including and identification number, position of the survival radio 3, the interrogation unit 1 can quickly determine the range and bearing of the survival radio 3 once the position of the helicopter 2 is known. The downed pilot may then be recovered or his position may be passed onto another recovery craft or team.

To assure integrity of the messages sent by interrogation unit 1 to radio 3 and from radio 3 to interrogation unit 1, two methods for data integrity are employed, i.e., bit interleaving and forward error correction.

Bit interleaving is used to distribute errors that are introduced due to bursts of noise interference that exist for durations of more than one bit.

Forward error correction is used to detect and correct random errors. Numerous classes of random error correcting codes exist, but a preferred one which is extensive and powerful is the Bose, Chauduri and Hocquenghem or BCH class code. This code adds additional bits to a block of data bits and permits both detection and correction of bit errors.

When a survival radio 3 receives a message from an interrogation unit 1, the application processor 310 checks for an ID match and then proceeds. If the ID code matches, the application processor 310 will respond to the message. If the message includes a position request, the application processor 310 obtains the latest position of the survival radio 3 from the GPS receiver 320, formats and encodes the data in the same manner as described above and provides the information to the transceiver 300 which transmits the information to the interrogation unit 1 over the LOS link 101. If the ID code does not match, the survival radio unit 3 will not respond.

When an identification code match occurs, if a message was also transmitted by the interrogator, the microprocessor 305 will decode and verify the message and the message will be displayed on the LCD display 309.

The survival radio unit 3 can also initiate a transmission to the interrogator 1, such as to send a text message. The user can select a stored message or input a free format text message of up to 40 alphanumeric characters with the keypad 310 and display 309 on the survival radio 3, 4 or 5.

The keypad 310 is used to access a menu shown on the display. The user can scroll through the available messages which are displayed in text. When the user sees the message that he desires to send, he selects it and the survival radio unit 3 sends the selected message. The keypad 310 and display 309 are used to enter alphanumeric pre-formatted messages as well.

One key of keypad 310 is a send key. The user of radio 3 initiates a transmission by pressing the send key and if the user has enabled the transceiver 300, the transceiver 300 will transmit the message. If the transceiver 300 has not been powered up, the unit microprocessor 305 cause the display 309 to display an appropriate reminder message. If the transceiver 300 has been powered up the message will be transmitted to the interrogator 1 via the LOS path will transmit an appropriate message.

The range of the system may be extended to Over The Horizon (OTH} by use of the airborne interrogation platform 2 to "relay" data between the survival radio units 3, 4 and 5 and the ground based interrogation unit 10. In this arrangement, the airborne platform 2 has LOS paths 101, 102, 103 to the survival radio units 3, 4 and 5 and a LOS path 105 to the ground based interrogation unit 10. The ground based unit 10 does not have a LOS path to any of the survival radio units 3, 4 or 5.

In the OTH mode of operation, the ground based interrogation unit 10 initiates interrogation of a SAR radio unit 3. The interrogation unit 1 located on the helicopter or airborne unit 2 detects the radio transmission from the ground based unit 10, decodes it and waits a predetermined period of time for the SAR radio unit 3 to respond. If the survival radio unit 3 does not respond within the predetermined time period, the airborne interrogation unit 1 re-transmits the interrogation received from the ground based equipment 10. The SRAM 206 of the airborne interrogation unit 1 stores the data interrogation transmission by the ground based unit 10 and re-transmits the interrogation. Because the SAR radio unit 3 is within LOS of the interrogation unit 1, it receives the interrogation transmission and responds accordingly. The airborne unit 1 detects the reply from the SAR unit 3 and re-transmits the reply to the ground based interrogator 10 thereby extending the effective range of the system as far as the ground based interrogator 10 is concerned.

The relay or OTH mode provides a significant advantage for search and rescue. The airborne platform 2 having an interrogation unit 1 operating in the relay mode may be an unmanned airborne vehicle such as a drone. This allows the interrogation unit 10 to be located in an area controlled by friendly forces. The relay unit 1 can be carried on an unmanned vehicle 2 going into the unfriendly area and searching. The time that the unmanned vehicle 2 is exposed to unfriendly forces may, in general, be quite large.

With the use of GPS in both the interrogation unit 1 and the survival radio unit 3 a high degree of accuracy is obtained in a relative distance between the two units. Either commercial GPS or the military GPS may be used and both provide a high degree of accuracy of less than 5 meters deviation from the actual distance. This results from the fact that the absolute position of the survival radio unit 3, 4 or 5 is not of as much significance as is the relative locations of the survival unit and the interrogation unit 1. Because the units are in close proximity, within a couple hundred miles of each other, they have the same error in absolute position. Even though the absolute position could be off by as much as several hundred meters, the relative position between the two units is precise, because they both have the same errors, resulting from their being in the same geographical area. Using the same satellite constellation, the system will have a relative accuracy equivalent to that of precise position system GPS like a differential GPS. In addition, differential correction factors may be transmitted in the data stream.

Each survival radio unit 3, 4 and 5 has 255 "canned" messages. In addition, each survival radio unit 3, 4 and 5 includes the capability to send a free format 40-character alphanumeric test message entered via the keyboard on the radio. The message composed and sent can be in any language and the operator of the unit 2, does not have to vocalize a message and risk being heard.

The messaging structure is set up to keep transmission time to a minimum to reduce the likelihood that a downed pilot could be located by direction finding on his transmitted signal. One objective is to keep air time of any reply to a minimum.

The messaging protocol utilized includes what are called "short packets". For longer messaging structures like the canned messages, more packets are added to the message.

Burst data transmission is utilized in all transmissions to and from the survival radio units 3, 4 and 5 rather than a continuous data stream, to reduce the chance of reception by unauthorized or undesirable elements. To extend the range of this system, interleaving and forward error correction corrects for errors in the burst transmission.

Figure 4:
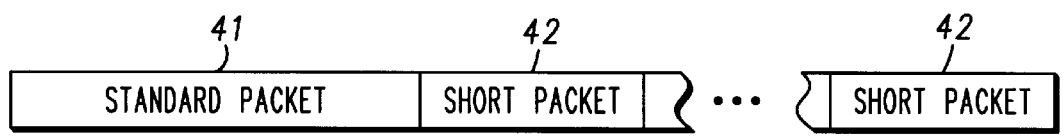
FIG. 4 illustrates the data format utilized in the system of FIG. 1.
Figure 5:
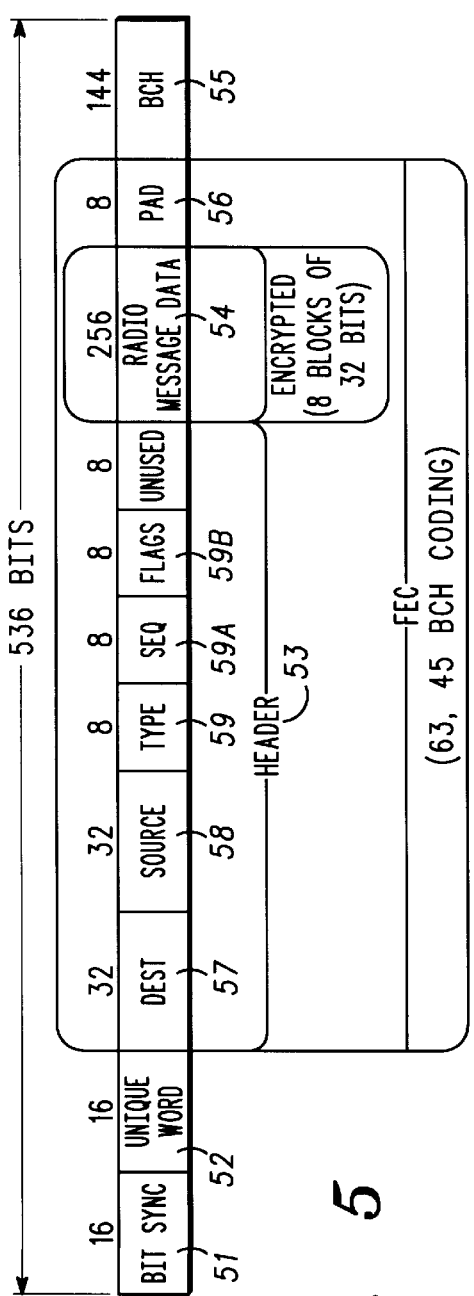
FIG. 5 illustrates in detail a data format for first packet messages transmitted from the SAR radio of FIG. 3.
Figure 6:
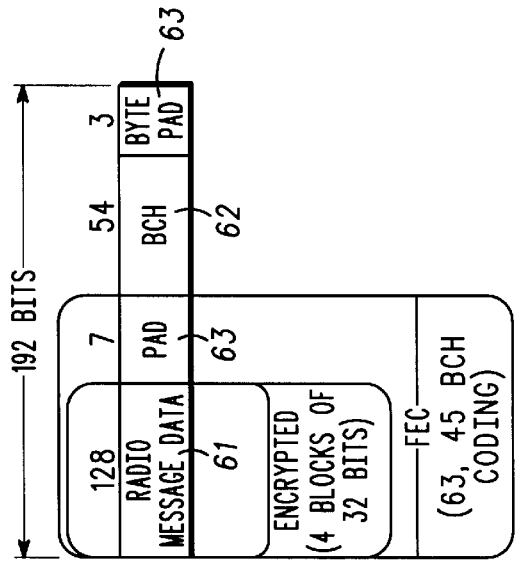
FIG. 6 illustrates a data format for second packet messages transmitted from the SAR radio of FIG. 3.

The data format for interrogation unit and survival radio unit response messages is shown in FIGS. 4, 5 and 6. Four message formats are utilized in a system in accordance with the invention. The four types of radio messages are Short Uplink, Long Uplink, Short Downlink and Long Downlink. As shown in FIG. 4, all messages are transmitted in packets and all share a common header which is sent in a standard packet 41. The remainder of the message comprises short packets 42.

The standard packet is shown in FIG. 5 and is 536 bits in length. The format includes 16 bits as the Bit Synch 51, 16 bits for a Unique Word 52, 56 bits as a header 53, 256 bits of encrypted "Radio Message Data" 54 and the remaining 152 bits are used for forward error correction (FEC) BCM code 55 and pad bits 56.

The "Unique Word" packet 52 which is two bytes or 16 bits represents a unique word to identify the start of a message. The "Dest" block 57 comprises 16 bits representing the user ID destination that is to receive the data. The "Source" block 50 comprises 16 bits representing the user ID source that sent the data. The "Type" block 59 comprises 8 bits used to identify one of four radio message protocols as follows:

| Description | Bit Representation | Value |
|---|---|---|
| Short uplink | 0011 0011 | 51 |
| Long uplink | 0011 0100 | 52 |
| Short downlink | 0011 0101 | 53 |
| Long downlink | 0011 0110 | 54 |

The "Seq" block 59a comprises 8 bits representing the number of short packets following the standard packet. "Flags" block 59b comprises an 8 bit field used to identify 3 options: Encryption, Relay, and Delay Response (2 bits unused).

| Description | Bit Representation |
|---|---|
| Encrypted Data | XXXX XXX1 |
| Relay | XXXX XX1X |
| Delay Response | XX11 11XX |

Short packets as shown in FIG. 6 are 192 bits in length and provide 128 bits for the radio message data 61. The remaining 64 bits are used for FEC BCM data 62 and pad bits 63. As seen in FIG. 6, part of the standard packet uses FEC. Only the radio message data 61 is encrypted. The entire short packet uses FEC. The standard packet header data "Bit Sync" 51 comprises 16 bits representing alternating O's and 1's.

Turning now to FIG. 7, the "Short Uplink" format is shown. An example of this message is a "send" with a canned message. This message reports the destination ID and source ID, position data, time fix, send time, datum, message number, purge flag, and delay response. The message comprises 32–8 bytes arranged as shown.

FIG. 8 illustrates message ID for a "Long Uplink." An example of this message is a "send" with a free-formatted text message. This message reports the destination ID and source ID, position data, time fix, send time, datum, message number, purge flag, delay response, and free-formatted text message.

FIG. 9 illustrates a message ID for a "Short Downlink." An example of this message is a "ping" with a canned message. This message reports the destination ID and source ID, message number, purge flag, and delay response. The text message number identifies a "canned message" being sent.

FIG. 10 illustrates a message ID for a "Long Downlink." An example of this message is a "ping" with a free-formatted text message. This message reports the destination ID and source ID, message number, purge flag, delay response, and free-formatted message.

Transmission and reception of data is accomplished using minimum phase shift keying, (MPSK), format at nominal baud rate of 1200 or 2400. This baud rate allows the data to be transmitted over a radio with a bandwidth that is compatible with an existing half-duplex voice channel. While the present implementation uses AM modulation, the technique is equally applicable to FM or PM modulation techniques.

A TDMA/CDMA message structure protocol configuration is used to assure that "collisions" do not occur due to high messaging traffic. This traffic density is increased by such functions as relay operation in which one or more intermediate fixed or moving sites are involved and text/canned messaging is used.

Message performance/reliability is enhanced by use of several techniques. A cumulative checksum is performed on the raw data used in each message. The raw data is encrypted using DES type 3 encryption techniques. The data may be further enhanced by the use of a Forward Error Correcting, FEC, code such as the Bose-Chadhuri-Hocquenghem, BCH, code which has the capability of not only detecting bit errors but also correcting multiple bit errors, for example, a 45/63 code length will correct up to three errors. Bit interleaving is used which distributes a byte across the entire message and makes the data much less susceptible to bursts of bit errors which may occur due to aperiodic bursts of interference.

Although the invention has been described in terms of a preferred embodiment, it will be readily apparent to those skilled in the art that various modifications may be made without departing from the spirit or scope of the invention.

What is claimed is:

1. A Search and Rescue System comprising:
    at least one survival radio, said survival radio comprising a GPS module for obtaining GPS derived location information and a transceiver for providing Line of Sight (LOS) communications to transmit said location information in response to receipt of an interrogation signals;

a first interrogation unit, said first interrogation unit having apparatus for sending interrogation signals to said survival radio to cause said survival radio to transmit said GPS derived location information signals, said interrogation signals being sent via a substantially Line of Sight (LOS) first communication link to said survival radio, said GPS derived location information signals being received from said survival radio over said first communication link, wherein said first interrogation unit is carried on an airborne vehicle;

at least one second interrogation unit, said second interrogation unit having apparatus for sending second interrogation signals to said first interrogation unit via a substantially LOS second communication link, said second communication link being between said first interrogation unit and said second interrogation unit, said first and second interrogation units being cooperatively operable such that said first interrogation unit relays information between said second interrogation unit and said survival radio such that substantially Over the Horizon (OTH) communication is obtainable between said survival radio and said second interrogation unit over said first and second communication links, at least part of said information comprising GPS derived location information identifying the location of said survival radio.

2. A search and Rescue System in accordance with claim 1, wherein:

said first interrogation unit is carried on an unmanned airborne vehicle.

3. Search and Rescue System in accordance with claim 1, wherein:

said second interrogation unit is at a ground based location, said second interrogation unit including apparatus to provide GPS correction information to said first interrogation unit.

4. A Search and Rescue System in accordance with claim 3, wherein: said first interrogation unit transmits said GPS correction information to said survival radio.

5. A Search and Rescue System in accordance with claim 1, wherein:

said at least one survival radio includes means for selecting one of a plurality of stored messages for delivery to said first interrogation unit.

6. A Search and Rescue System in accordance with claim 5, wherein: said survival radio includes in each message transmitted an identification code to uniquely identify said survival radio.

7. A Search and Rescue System, comprising:

a survival radio, said survival radio comprising a GPS receiver, a transceiver, and a controller, said survival radio having a unique identification code associated therewith, said survival radio controller responding to interrogation messages received over a substantially line of sight first communication path by said transceiver and having contained therein said unique identification code by causing said transceiver to transmit location information generated by said GPS receiver and said identification code over said first communication path;

a first interrogation unit comprising a second controller and a second transceiver, said second controller being operable to cause said second transceiver to transmit interrogation messages containing said survival radio identification code, said second controller being further operable to identify messages received by said second transceiver as being from said survival radio; and a second interrogation unit comprising a third controller and a third transceiver, said third controller being operable to cause said third transceiver to generate said interrogation messages and to transmit said interrogation messages to said first interrogation unit, said first interrogation unit being responsive to said interrogation messages to re-transmit said interrogation messages to said survival radio, at least some of said interrogation messages including GPS position correction data that can be used by said survival radio to correct a local position determined by said GPS receiver, said at least some interrogation messages being among said interrogation messages that are re-transmitted to said survival radio to cause said survival radio to transmit said location information over said first communication path.

8. A Search and Rescue System in accordance with claim 7, comprising:

a substantially Line of Sight (LOS) first communication path between said survival radio and said first interrogation unit; and a substantially LOS second communication path between said first interrogation unit and said second interrogation unit.

9. A Search and Rescue System in accordance with claim 8, wherein:

said first communication path and said second communication path are operable to provide an Over the Horizon (OTH) communication path between said survival radio and said second interrogation unit.

10. A Search and Rescue System in accordance with claim 7, comprising:

a third GPS receiver in said second interrogation unit;

where in said third controller generates said GPS correction data from GPS information obtained from said third GPS receiver and data pertaining to the geographic location of said second interrogation unit.

11. A Search and Rescue System in accordance with claim 7, wherein:

said GPS correction data includes GPS differential correction data.

12. A method of operating a Search and Rescue system, said system comprising at least one survival radio, at least one first interrogation unit, and a second interrogation unit, said method comprising the steps of:

generating an interrogation message at said second interrogation unit, said interrogation message containing a unique identification code corresponding to a first survival radio;

transmitting said interrogation message to said first interrogation unit, wherein said first interrogation unit is carried on an airborne vehicle;

utilizing said first interrogation unit to relay said interrogation message to said first survival radio;

responding to said interrogation message, at said first survival radio, by generating and transmitting a response message containing said unique identification code and geographic location information;

receiving said response message at said first interrogation unit; and relaying said response message from said first interrogation unit to said second interrogation unit.

13. A method in accordance with claim 12, comprising:

receiving at said survival radio GPS signals and generating said geographic location information from said GPS signals.

14. A method in accordance with claim 13, comprising:

generating at said second interrogation unit GPS correction information and transmitting said GPS correction information to said survival radio via said first interrogation unit.

15. A method in accordance with claim 14, comprising:

receiving GPS signals at said second interrogation unit and determining said GPS correction information from said GPS signals and data pertaining to the geographic location of said second interrogation unit.

16. A method in accordance with claim 12, wherein:

said step of generating an interrogation message includes encoding said interrogation message using an error correction code.

17. A method in accordance with claim 12, wherein:

said step of generating an interrogation message includes utilizing bit interleaving.

18. A method in accordance with claim 15, comprising:

receiving GPS signals at said first interrogation unit and determining the position of said first interrogation unit from said GPS signals.

19. A method in accordance with claim 14, comprising:

using said GPS correction information at said first interrogation unit to determine the position of said first interrogation unit.

20. A method in accordance with claim 15, comprising:

operating said second interrogation unit at a fixed ground based location during the duration of a search.

* * * * *